US012171187B2

(12) United States Patent
Greive et al.

(10) Patent No.: US 12,171,187 B2
(45) Date of Patent: Dec. 24, 2024

(54) DRIVE SYSTEM FOR A POULTRY AND/OR SWINE ENCLOSURE

(71) Applicant: PERDUE FOODS LLC, Salisbury, MD (US)

(72) Inventors: Raymond Paul Greive, Murrieta, CA (US); Jeffrey Lane McDaniel, Murrieta, CA (US); Daniel J. Coady, Warner Springs, CA (US)

(73) Assignee: PERDUE FOODS LLC, Salisbury, MD (US)

( * ) Notice: Subject to any disclaimer, the term of this patent is extended or adjusted under 35 U.S.C. 154(b) by 1079 days.

(21) Appl. No.: 17/017,610

(22) Filed: Sep. 10, 2020

(65) Prior Publication Data

US 2021/0092934 A1 Apr. 1, 2021

Related U.S. Application Data

(60) Provisional application No. 62/898,515, filed on Sep. 10, 2019.

(51) Int. Cl.
*A01K 1/00* (2006.01)
*A01K 31/18* (2006.01)

(52) U.S. Cl.
CPC ............ *A01K 1/0035* (2013.01); *A01K 31/18* (2013.01)

(58) Field of Classification Search
CPC ................................ A01K 1/0035; A01K 31/18
See application file for complete search history.

(56) References Cited

U.S. PATENT DOCUMENTS

| 3,568,643 | A | * | 3/1971 | Wessinger | ........... | A01K 45/005 |
| | | | | | | 43/6.5 |
| 3,602,198 | A | * | 8/1971 | Tackett | ................ | A01K 45/005 |
| | | | | | | 119/846 |
| 3,702,600 | A | * | 11/1972 | Bright | ................. | B65G 41/002 |
| | | | | | | 119/846 |
| 3,738,327 | A | | 6/1973 | Stirling | | |
| 3,895,727 | A | * | 7/1975 | Rucker | ................ | B62D 53/067 |
| | | | | | | 414/537 |
| 4,048,959 | A | * | 9/1977 | Steele | ................. | A01K 1/0035 |
| | | | | | | 119/512 |

(Continued)

FOREIGN PATENT DOCUMENTS

WO 2018/087411 A1 5/2018

OTHER PUBLICATIONS

International Preliminary Report on Patentability in PCT/US2020/050262, mailed Mar. 15, 2022.

(Continued)

*Primary Examiner* — Mark C Hageman
*Assistant Examiner* — Ashley K Romano (57) ABSTRACT

A drive system configured to move an elongated mobile poultry and/or swine enclosure. The drive system may comprise an axle at least 20 feet in length. The drive system may include multiple wheels coupled to the axle. The multiple wheels may have diameters between 6 and 36 inches. The drive system may include a motor coupled to the axle that causes the axle and/or the multiple wheels to rotate and move the elongated mobile poultry enclosure across a field. The elongated mobile poultry enclosure may be at least 40 feet in length and the drive system is coupled to the elongated mobile poultry enclosure.

15 Claims, 6 Drawing Sheets

(56) References Cited

U.S. PATENT DOCUMENTS

| | | | |
|---|---|---|---|
| 4,341,181 A * | 7/1982 | Fair | A01K 3/001 |
| | | | 119/512 |
| 4,419,963 A | 12/1983 | Willibrordus | |
| 4,445,460 A | 5/1984 | Stencil | |
| 5,054,430 A | 10/1991 | Weelink | |
| 5,392,872 A * | 2/1995 | Ducote | B62D 13/02 |
| | | | 301/124.1 |
| 5,902,089 A * | 5/1999 | Sinn | A01K 45/005 |
| | | | 414/346 |
| 6,447,984 B1 | 11/2002 | Kleinhasser | |
| 7,051,680 B2 * | 5/2006 | Lindvall | A01K 1/0135 |
| | | | 119/700 |
| 7,500,448 B1 | 3/2009 | Melhorn | A01K 31/002 |
| | | | 119/401 |
| 7,578,247 B2 * | 8/2009 | Horn | A01C 15/006 |
| | | | 111/200 |
| 8,355,835 B2 * | 1/2013 | Vlaar | A01K 1/105 |
| | | | 242/550 |
| 8,919,286 B2 * | 12/2014 | Koch | A01K 1/10 |
| | | | 119/58 |
| 9,844,204 B2 | 12/2017 | Schwartz | |
| 11,503,811 B2 * | 11/2022 | Greive | A01K 31/007 |
| 2007/0026779 A1 * | 2/2007 | Lang | A22B 3/005 |
| | | | 452/66 |
| 2007/0235969 A1 * | 10/2007 | Harrill | B60G 9/003 |
| | | | 280/86.75 |
| 2011/0293394 A1 * | 12/2011 | Koehn | A01K 1/0128 |
| | | | 414/813 |
| 2015/0075442 A1 * | 3/2015 | Wilson | A01K 3/001 |
| | | | 119/512 |
| 2015/0250136 A1 * | 9/2015 | Wilson | A01K 3/001 |
| | | | 119/452 |
| 2018/0054156 A1 * | 2/2018 | Lokey | G05D 3/105 |
| 2019/0110430 A1 | 4/2019 | Badiou | |
| 2019/0335651 A1 * | 11/2019 | Altomare | A01B 33/04 |

OTHER PUBLICATIONS

International Search Report and Written Opinion in PCT/US2020/050262, mailed on Nov. 30, 2020.

* cited by examiner

DRIVE SYSTEM FOR A POULTRY AND/OR SWINE ENCLOSURE

CROSS-REFERENCE TO RELATED APPLICATIONS

The present application claims the benefit of priority to U.S. Provisional Patent Application No. 62/898,515, filed Sep. 10, 2019, the contents of which are incorporated herein in its entirety.

FIELD

The disclosure relates to a drive system for a mobile poultry or swine enclosure.

BACKGROUND

Conventional poultry and swine production use stationary facilities. Due to their stationary nature, poultry and/or swine in conventional systems often live on dirty litter and/or fecal matter. As such, conventional poultry and/or swine may experience compromised immune system function leading to decreased performance, low animal welfare, and potentially require the use of vaccines, antibiotics, drugs, ionophores, and other interventions to maintain animal health. Stationary poultry and/or swine systems also require significant manure management systems including manure lagoons, litter, and/or waste disposal/removal which lead to high materials costs, elevated labor costs, and environmental concerns. Furthermore, poultry and/or swine that are treated with vaccines, drugs, antibiotics, or other interventions may subsequently lead to negative health effects on humans that consume their meat and/or eggs. Mobile poultry and/or swine coops solve these issues but present issues with feed storage.

Existing methods of pasture raising poultry and/or swine are expensive for both farmers and consumers and thus are typically limited to small scale production. The amount of land and labor required to manage a large quantity of grazing poultry and/or swine has typically prevented pasture raised poultry and/or swine from being scalable for commercial poultry and/or swine farmers.

SUMMARY

One aspect of the disclosure relates to a drive system for a poultry and/or swine enclosure. The poultry and/or swine enclosure may be movable and/or mobile. The drive system for a poultry and/or swine enclosure may move and/or cause a poultry and/or swine enclosure to move across a field to provide access to fresh pasture and bedding daily, eliminating the need for litter disposal, bedding, and vaccines, drugs, or antibiotics and allowing them to graze on pasture, grass, insects, worms, seeds, weeds, and flowers.

In some implementations, the poultry and/or swine enclosure may be an elongated poultry and/or swine enclosure. By way of non-limiting example, the poultry and/or swine enclosure may be 20 to over 1000 feet in length. Moving such a large and/or long poultry and/or swine enclosure may require a unique drive system because the integrity of the poultry and/or swine enclosure may not allow it to be pulled from a single point with a tractor. Additionally, using a cabling system to pull the poultry and/or swine enclosure may have several problems. For example, cabling systems could fail, they would require a lot of equipment, it would require a very slow speed and/or pace, and the cabling system and/or tractor may damage the poultry and/or swine grazing field.

One aspect of the drive system for a poultry and/or swine enclosure may include a multiple wheel single axle drive system. The axle may run the length of the poultry and/or swine enclosure and/or nearly the length of the poultry and/or swine enclosure. One or more wheels may be coupled to the axle such that when the axle rotates, the wheels rotate. The drive system may include one or more motors to turn the axle and drive the mobile poultry and/or swine enclosure.

The axle may comprise one or more segments coupled together and/or a solid single axle. The axle may be 5-1000 feet in length and/or run the length or nearly the length of the poultry and/or swine enclosure. The axle may be composed of any suitable material that can withstand the torque output by one or more motors to turn the axle. By way of non-limiting example, the axle may be made of metal, a composite, and/or other suitable material.

Multiple wheels may be coupled to the axle. The one or more wheels may have any diameter necessary for moving the poultry and/or swine enclosure. By way of non-limiting example, the wheels may be 6-36 inches in diameter, and/or any other suitable diameter for moving the poultry and/or swine enclosure. By way of non-limiting example, the wheels may be around 16-20 inches in diameter. The wheels may at least partially dictate the speed of the movement of the poultry and/or swine enclosure. As such, the wheel size may be determined based on cost, reliability, and functionality.

The wheels may be coupled to the axle via one or more wheel hubs. In some implementations, the wheels may or may not have tires. Wheels without tires may be made of any metal, plastic, composite, and/or other suitable material. By way of non-limiting example, the wheels may be made of steel. If the wheels have tires, the tires may be foam filled tires, air-filled pneumatic tires, rubber tires, and/or other types of tires.

The drive system for the poultry and/or swine enclosure may include one or more motors. The one or more motors may cause the axle and/or wheels to rotate. The one or more motors may be electric, gas, a hybrid, and/or have other power sources. In some implementations, the motor may be powered by off-grid power generation.

The drive system for the poultry and/or swine enclosure may be coupled to and/or part of the poultry and/or swine enclosure. In some implementations, the drive system for the poultry and/or swine enclosure may be separate from the poultry and/or swine enclosure. In some implementations, a single drive system may be used for multiple poultry and/or swine enclosures (the same and/or different sizes. As such, for example, if a poultry and/or swine enclosure becomes damaged, the poultry and/or swine enclosure could be replaced without replacing and/or impacting the drive system. In some implementations, the drive system for the poultry and/or swine enclosure may be incorporated into the poultry and/or swine enclosure as part of the poultry and/or swine enclosure.

In some implementations, the drive system for a poultry and/or swine enclosure may include hydraulics. By way of non-limiting example, the drive system may include one or more hydraulic motors, hydraulic axle suspension, and/or other hydraulic systems.

These and other objects, features, and characteristics of the disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

DETAILED DESCRIPTION

Figure 1:
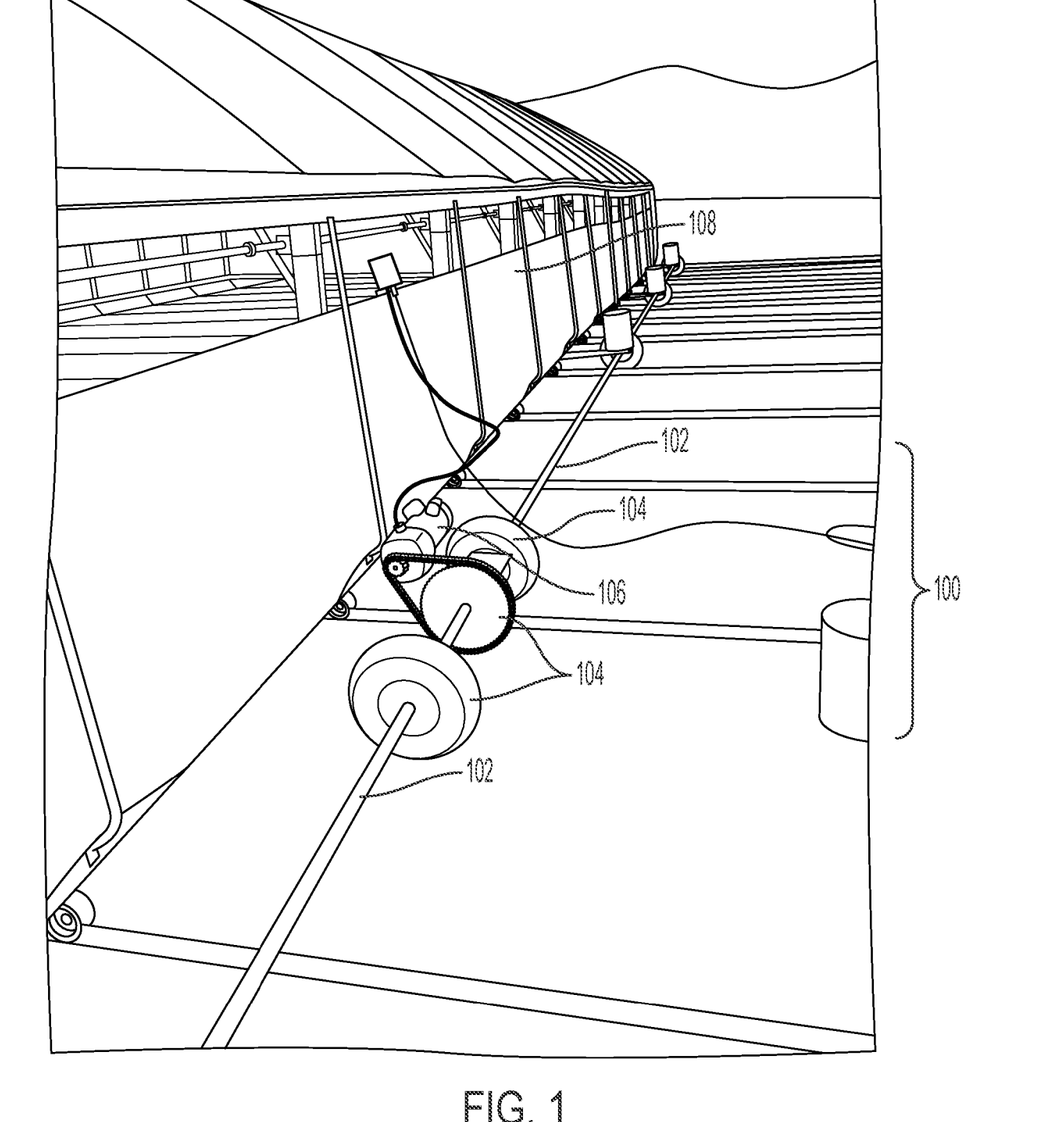
FIG. 1 illustrates a drive system and poultry and/or swine enclosure, in accordance with one or more implementations.

FIG. 1 illustrates a drive system and poultry enclosure, in accordance with one or more implementations. Drive system 100 may move and/or drive poultry enclosure 108 across a field. Poultry enclosure 108 may comprise an elongated poultry enclosure. Poultry enclosure 108 may be 20 to over 1000 feet in length. Drive system 100 may be the same length, nearly the same length, and/or shorter in length than poultry enclosure 108. Drive system 100 may be a multiple wheel, single axle drive system. In some implementations, drive system 100 may comprise multiple drive casters where individual wheels have independent drive and/or rotation (not pictured in FIG. 1).

In some implementations, drive system 100 may include axle 102. Axle 102 may be the same length, nearly the same length, and/or shorter in length than poultry enclosure 108. In some implementations, one or more wheels 104 may be coupled to axle 102. Axle 102 may be the same length, nearly the same length, and/or shorter in length than poultry enclosure 108. Motor 106 may rotate axle 102 and/or wheels 104 to move poultry enclosure 108. Axle 102 may comprise one or more segments coupled together to for a single axle and/or a solid single axle. Axle 102 may be 5-1000 feet in length and/or run the length, or nearly the length of poultry enclosure 108. In some implementations, axle 102 may be shorter in length than poultry enclosure 108. Axle 102 may be composed of any suitable material that can withstand the tension and shearing forces from the torque output by motor 106 to turn the axle. By way of non-limiting example, axle 102 may be made of metal, a composite, and/or other suitable material.

Wheels 104 may be coupled to the axle. Wheels 104 may or may not have tires. In one non-limiting use example, wheels 104 may not have tires and/or may be made of steel. In some implementations, wheels 104 may include foam filled tires, air-filled pneumatic tires, rubber tires, and/or other types of tires.

Drive system 100 may include one or more motors 106. Motor 106 may actuate axle 102 causing it to rotate and/or wheels 104 to rotate. Motor 106 may be electric, gas, a hybrid, and/or have other power sources. In some implementations, the motor may be powered by off-grid power generation.

Drive system 100 may operate with or without tracks and/or rails on the field (FIG. 1 includes tracks but they are not required). Drive system 100 may be coupled to poultry and/or swine enclosure one. By way of non-limiting example, drive system 100 may be coupled to poultry and/or swine enclosure 108 via one or more removable fasteners.

Figure 2:
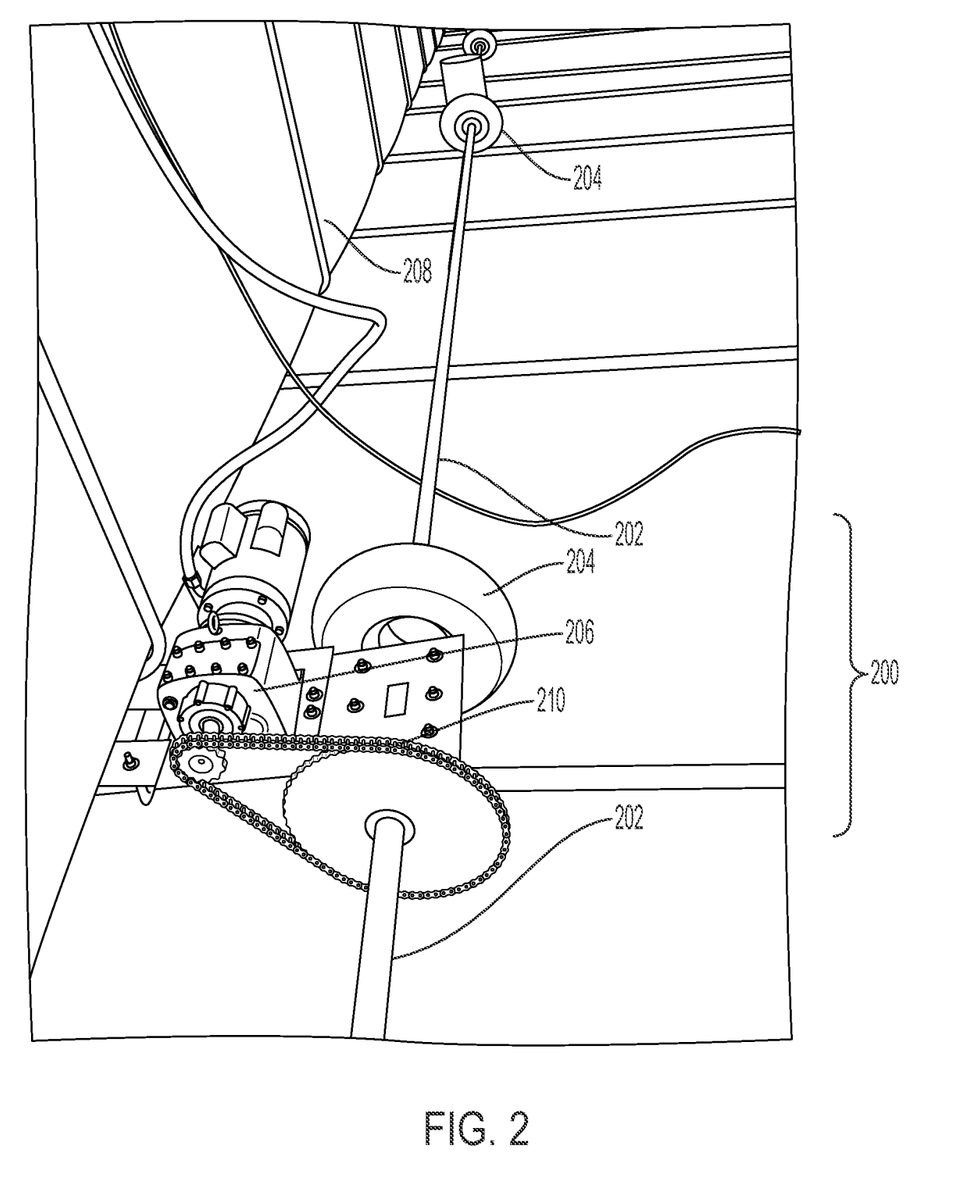
FIG. 2 illustrates a drive system, in accordance with one or more implementations.

FIG. 2 illustrates a drive system in accordance with one or more implementations. Drive system 200 may move and/or drive poultry and/or swine enclosure 208 across a field. Drive system 200 may be a multiple wheel, single axle drive system. Axle 202 may be the same length, nearly the same length, and/or shorter in length than poultry and/or swine enclosure 208. One or more wheels 204 may be coupled to axle 202.

Motor 206 may rotate axle 202 and/or wheels 204 to move/drive poultry and/or swine enclosure 208. In some implementations, motor 26 may turn axle 202 via drive chain 210. Other motor assemblies aside from a drive chain are contemplated such as independent wheel motor systems. Motor 206 may turn wheels 204 via drive chain 210 and/or axel 202. Motor 106 may be electric, gas, a hybrid, and/or have other power sources. In some implementations, the motor may be powered by off-grid power generation. Wheels 204 may or may not have tires. Wheels without tires may be made of any metal, plastic, composite, and/or other suitable material. By way of non-limiting example, wheels 204 may be made of steel. If wheels 204 have tires, the tires may be foam filled tires, air-filled pneumatic tires, rubber tires, and/or other types of tires.

In some implementations, the drive system for a poultry and/or swine enclosure may include hydraulics. By way of non-limiting example, the drive system may include one or more hydraulic motors, hydraulic axle suspension, and/or other hydraulic systems.

Figure 3:
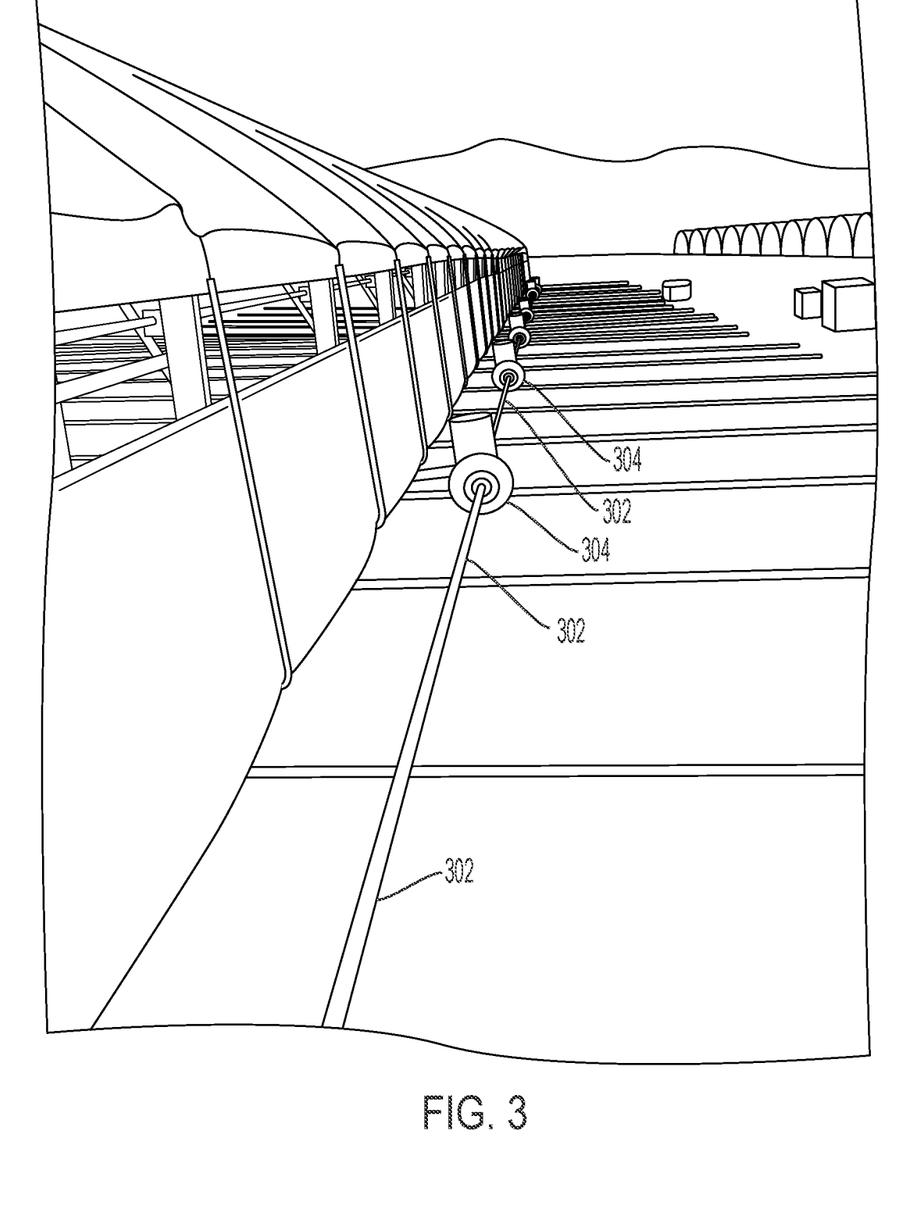
FIG. 3 illustrates a single axle for a drive system for an elongated poultry and/or swine enclosure, in accordance with one or more implementations.

FIG. 3 illustrates a single axle for a drive system for an elongated poultry and/or swine enclosure, in accordance with one or more implementations. Axle 302 may be 5-1000 feet in length. In some implementations, axle 302 may run the length, or nearly the length of poultry and/or swine enclosure 108. In some implementations, axle 302 may be shorter in length than a poultry and/or swine enclosure. Axle 302 may be composed of any suitable material that can withstand the tension and/or shearing forces from the torque output a motor assembly to turn the axle. By way of non-limiting example, axle 302 may be made of metal, a composite, and/or other suitable material. Axel 302 may include one or more wheels 304 coupled to axle 302.

Figure 4:
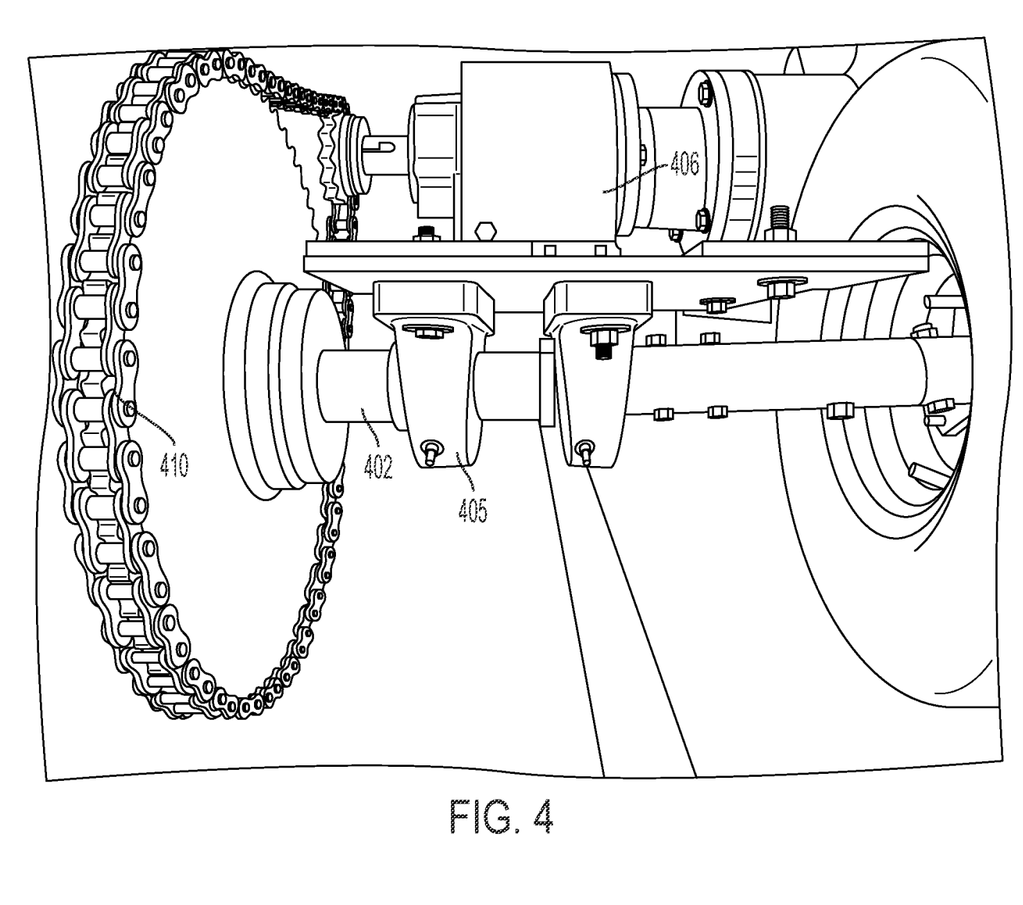
FIG. 4 illustrates a motor and drive chain assembly coupled to an axle, in accordance with one or more implementations.

FIG. 4 illustrates a motor and drive chain assembly coupled to an axle, in accordance with one or more implementations. Motor 406 and or drive chain assembly 410 may be coupled to axle 402 via one or more fasteners 405. By way of non-limiting example, fasteners 405 may include bolts, u-bolts, vices, and/or other fasteners that may be able to withstand elevation changes and/or high torque.

Figure 5:
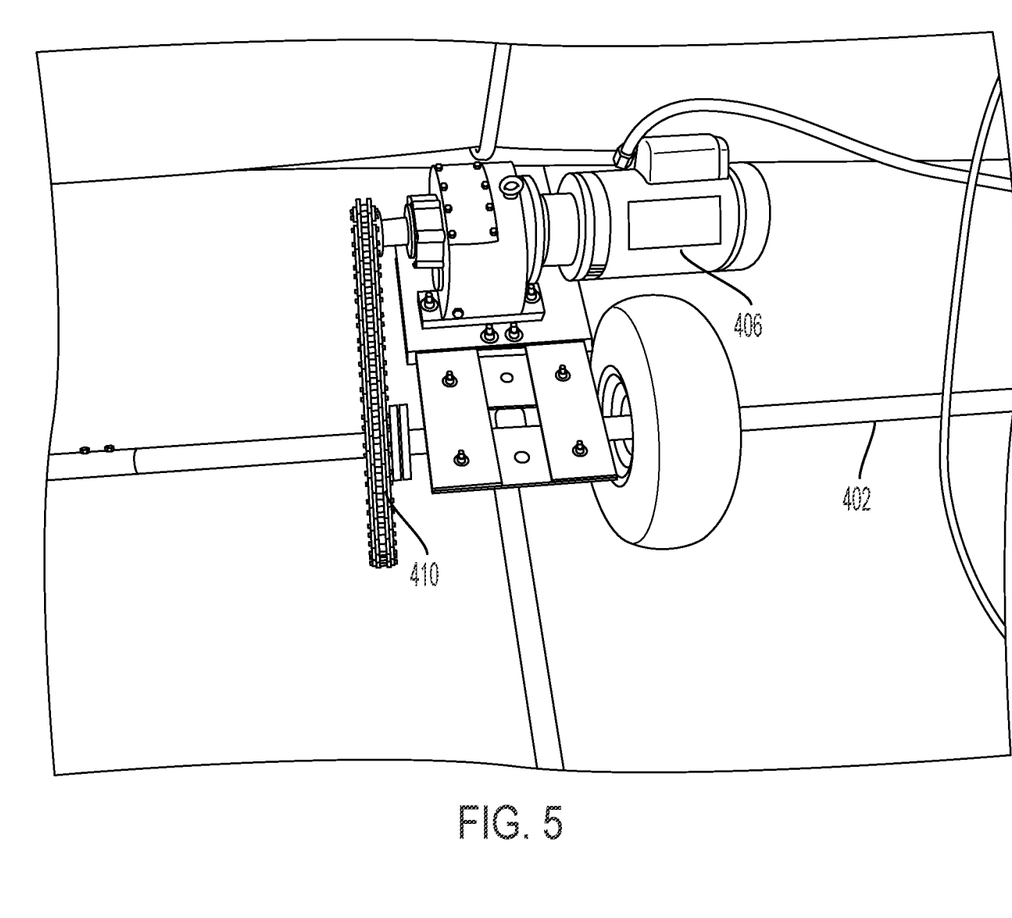
FIG. 5 illustrates an alternate view of the motor and drive chain assembly coupled to the axel in FIG. 4, in accordance with one or more implementations.

FIG. 5 illustrates an alternate view of the motor and drive chain assembly coupled to the axel in FIG. 4, in accordance with one or more implementations.

Figure 6:
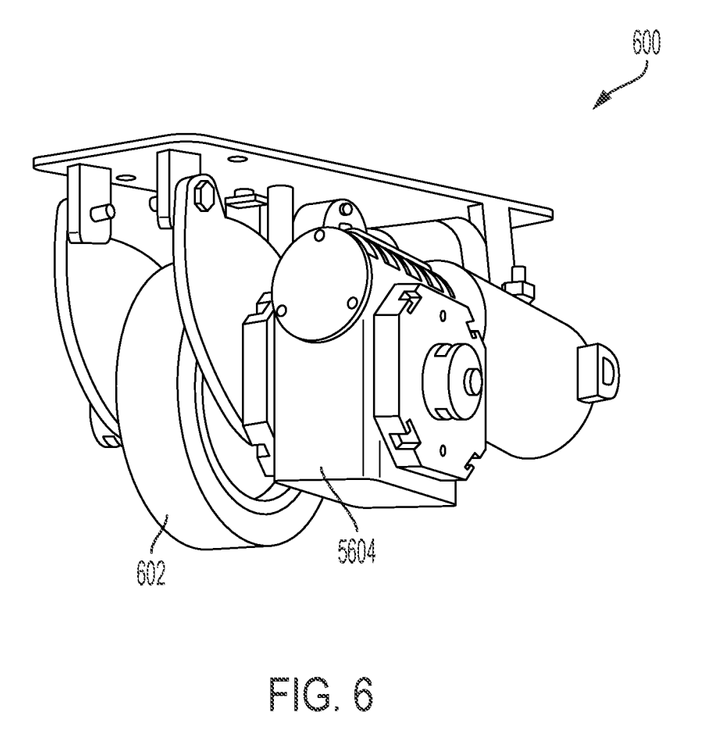
FIG. 6 illustrates a drive caster, in accordance with one or more implementations.

FIG. 6 illustrates a drive caster, in accordance with one or more implementations. In some implementations, the drive system may include one or more drive casters 600. Drive casters 600 may comprise a wheel 602 having an independent drive and/or rotation mechanism 604. By way of non-limiting example, drive casters 600 may comprise an independently motorized wheel apparatus. In some implementations, the drive system described herein may not include an axel driven by a motor that causes the wheels to rotate, but rather multiple drive casters (the same as or similar to drive caster 600) having independent motors that drive/move the mobile poultry and/or swine enclosure. The independent wheel motors may be arranged similarly to the axle configuration but motors may drive the independent wheels to which they correspond. The drive casters may be powered via electric power, gas power, diesel power, hydraulic power, pneumatic, and/or other types of power.

Returning to FIG. 1, in some implementations, the system may include motor 106 and/or one or more processors (not pictured) configured by machine-readable instructions to actuate the motor. Actuating motor 106 may cause drive system 100 to move poultry and/or swine enclosure 108 at least partially across a field. The one or more processors may be programmed to actuate motor 106 and/or cause drive system 100 to move poultry and/or swine enclosure 106 in a linear, lateral, and/or circular manner. In some implementations, drive system 100 may move poultry and/or swine enclosure 108 in accordance with a schedule and/or predetermined speed. In some implementations, the schedule and/or predetermined speed may indicate when drive system 100 is move, a duration and/or multiple durations drive system 100 will move, a speed at which drive system 100 will move, and/or other characteristics of the movement of the drive system 100. This schedule may be consistent, or may be adjusted according to the age, size, quantity, manure, and/or lifecycle of the poultry and/or swine, and/or seasonal conditions.

In some implementations, the system may include multiple motors 106 corresponding to individual ones of the multiple wheels 104. These independent wheel motors may enable steering of the poultry and/or swine enclosure without required a single axel to drive movement. Alternatively, the single axel system may only enable movement in a straight line. The multiple independently motorized wheels may operate simultaneously and/or independently. In some implementations, the multiple independently motorized wheels may operate in unison and/or cooperatively. The multiple independent wheel motors may provide secondary rotation allowing directional changes to the poultry and/or swine enclosures.

In some implementations, the systems and/or methods described herein may be applicable to a livestock enclosure in addition to a poultry and/or swine enclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An elongated mobile poultry and/or swine enclosure with a drive system configured to move the elongated mobile poultry and/or swine enclosure, the drive system comprising:
    an axle;
    multiple wheels coupled to the axle, the multiple wheels having diameters between 6 and 36 inches; and
    a motor coupled to the axle that causes the axle and/or the multiple wheels to rotate and move the elongated mobile poultry enclosure across a field,
    wherein the elongated mobile poultry enclosure is at least 40 feet in length and the axle is the same length or nearly the same length as the elongated mobile poultry enclosure, and wherein the drive system is coupled to the elongated mobile poultry enclosure.

2. The drive system of claim 1, wherein the axle comprises multiple axle segments coupled together to form a single axle.

3. The drive system of claim 1, wherein the axle comprises a solid, single axle.

4. The drive system of claim 1, wherein the axle is made of metal and/or a composite material.

5. The drive system of claim 1, wherein the axle is at least 40 feet in length and the elongated mobile poultry enclosure is at least 80 feet in length.

6. The drive system of claim 1, wherein the axle is at least 80 feet in length and the elongated mobile poultry enclosure is at least 160 feet in length.

7. The drive system of claim 1, wherein the axle is at least 150 feet in length and the elongated mobile poultry enclosure is at least 300 feet in length.

8. The drive system of claim 1, wherein the axle is at least 300 feet in length and the elongated mobile poultry enclosure is at least 600 feet in length.

9. The drive system of claim 1, wherein the axle is at least 500 feet in length and the elongated mobile poultry enclosure is at least 1000 feet in length.

10. The drive system of claim 1, wherein the multiple wheels do not have tires.

11. The drive system of claim 1, wherein the multiple wheels are made of metal.

12. The drive system of claim 1, wherein individual ones of the multiple wheels include tires.

13. The drive system of claim 1, wherein the motor is powered by one or more of gas power, electric power, hybrid power, and/or solar power.

14. The drive system of claim 1, wherein the motor is configured to turn the axle via a drive chain.

15. The drive system of claim 1, wherein the motor includes a hydraulic motor and/or the drive system further includes hydraulic axle suspension.

* * * * *